United States Patent [19]
Larsen et al.

[11] 4,453,602
[45] Jun. 12, 1984

[54] RESILIENT HARROW TINE

[75] Inventors: Bent H. Larsen, Guldbaek; Kim I. Christensen, Nibe, both of Denmark

[73] Assignee: Kongskilde Koncernselskab A/S, Soro, Denmark

[21] Appl. No.: 418,621

[22] Filed: Sep. 16, 1982

[30] Foreign Application Priority Data

Sep. 24, 1981 [DK] Denmark .......................... 4223/81

[51] Int. Cl.³ ............................................. A01B 35/06
[52] U.S. Cl. .................................................. 172/707
[58] Field of Search ....................... 172/707, 708, 710

[56] References Cited

FOREIGN PATENT DOCUMENTS

| | | | |
|---|---|---|---|
| 2810804 | 10/1978 | Fed. Rep. of Germany | 172/707 |
| 306195 | 11/1968 | Sweden | 172/707 |
| 2050131 | 1/1981 | United Kingdom | 172/707 |

OTHER PUBLICATIONS

Vibro Crop Advertising Brochure of Kongskilde, Exeter, Ontario.

Primary Examiner—Richard J. Johnson
Attorney, Agent, or Firm—Anthony A. O'Brien

[57] ABSTRACT

In a resilient harrow tine of S-like shape and comprising a resilient hoop portion bent substantially to form a circle and having a cross-section the basic form of which is a rectangle with a ratio between the width and the height of approximately 3, the ratio between the strength and the material consumption has been optimized by designing the cross-section so that the neutral stress line is displaced in the direction towards the outwardly facing long side of the cross-section of the resilient hoop portion in relation to the longitudinal center line of the circumscribed rectangle of the cross-section.

1 Claim, 3 Drawing Figures

RESILIENT HARROW TINE

BACKGROUND OF THE INVENTION

The invention relates to a resilient harrow tine of S-like shape and comprising an upper, resilient hoop portion bent substantially to form a circle and having a cross-section, the circumscribed rectangle of which has a ratio between the width and the height of about 3, the cross-sectional long side facing outwards in the resilient hoop portion being substantially rectilinear.

A harrow tine of said type is generally produced from a rolled steel bar of rectangular or substantially rectangular cross-section.

Such a harrow tine blank is for instance disclosed in United Kingdom patent specification No. 1,178,370 according to which the cross-section is slightly convex at one of its long sides. By bending said blank into S-shape the cross-section assumes a practically symmetrical shape and the neutral axis of stress becomes consequently coincident with the longitudinal centre line of the cross-section.

When in operation, the resilient hoop portion of the tine is tensioned at its outwardly facing side and for this reason much care is taken in dimensioning and production to avoiding stress concentrations at this side. In known harrow tines this is achieved, inter alia by providing suitably smooth transitions between the outwardly facing side and the short sides and by ball hammering the surfaces whether the cross-section of the blank is absolutely rectangular or possibly slightly curved as stated above.

As a consequence of the above mentioned measures, harrow tines manufactured according to the prior technqiue may fulfil the conditions necessary for the working ability of the tine with a view to strength, resilience and stability.

By thorough analysis of the stress to which the harrow tine is subjected when in operation, for instance by means of strain gauges and by estimating the stress distribution over the cross-section, it has been established, however, that the material is not fully utilized. This implies that known harrow tines require more material than strictly necessary to obtain the desired strength, and from this recognition it is an aim of the invention to provide a harrow tine with an optimum proportion between strength and material consumption.

SUMMARY OF THE INVENTION

In the harrow tine according to the invention the opposite cross-sectional side, i.e. the inwardly facing side of the resilient hoop portion, from the corresponding side of the circumscribed rectangle. Thereby the neutral stress line of the cross-section is displaced from the longitudinal centre line of the circumscribed rectangle towards the long side facing outwards in the resilient hoop portion.

Such a displacement of the neutral line entails a reduction in tensile stress, particularly at the corner areas at the outwardly facing long side as compared to the tensile stress in the corresponding areas of prior harrow tines. The displacement of the line further causes the compressive stress to intensify in the cross-sectional portions facing inwardly, but in view of the fact that the resilient tine material is less notch-sensitive to compressive stress than to tensile stress, the altered stress distribution obtained may be utilized to reduce the cross-sectional area without influencing the lifetime of the harrow tine measured in the number of influences or pulses within a given range of load.

These features provide for obtaining savings in weight from about 5 to 25% in comparison with corresponding prior art S-shaped harrow tines.

DETAILED DESCRIPTION OF THE PREFERRED EMBODIMENTS OF THE INVENTION

Figure 1:
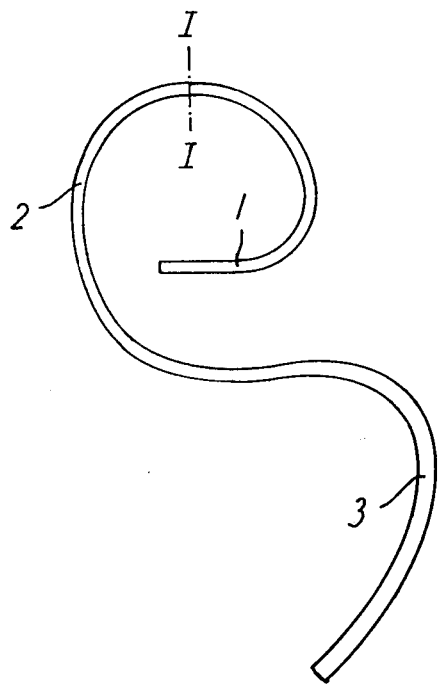
FIG. 1 shows a side elevation of an S-shaped harrow tine.
Figure 2:
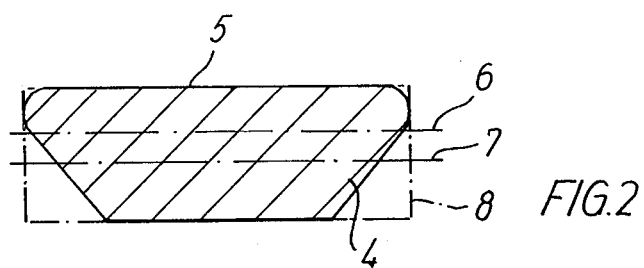
FIG. 2 is a cross-section on a larger scale along line I—I in FIG. 1 and in a first embodiment of the invention.

The harrow tine shown in FIG. 1 comprises in the usual manner a rectilinear attachment portion 1 continuing into a resilient hoop portion 2 bent substantially along a circle and passing into an opposedly curved portion 3 forming the harrow tine proper and to which a separate harrow point or tip, not shown, may be secured. According to FIG. 2 the harrow tine has a cross-section 4 with a basic form like a symmetrical trapezium, the base line 5 of which faces upwards, i.e. outwardly in the resilient hoop portion 2.

The neutral stress line 6 of said cross-section is located nearer to the base line 5 than the longitudinal centre line 7 of the circumscribed rectangle 8 of the cross-section. The same strength may thus be obtained with a cross-sectional area that is reduced approximately 15% in comparison with a harrow tine or ordinary design.

Figure 3:
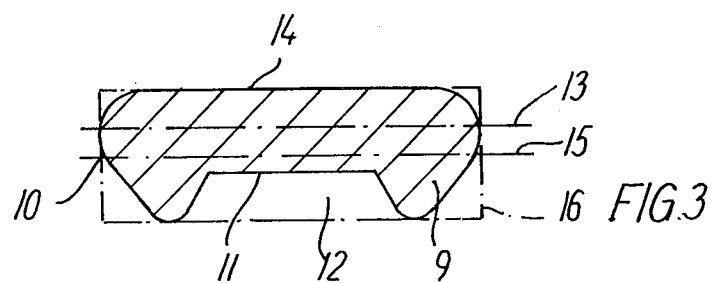
FIG. 3 is a similar cross-section of another embodiment.

FIG. 3 shows another embodiment in which the cross-section 9 of the harrow tine in its basic form is a rectangle, preferably with circular-arched short sides 10. The inwardly facing cross-sectional side 11 of the resilient hoop portion 2 presents a symmetrical trapezoidal recess 12 with a width declining inwardly of the cross-section.

The neutral stress line 13 of said cross-section is displaced towards the outwardly facing long side 14 of the cross-section in relation to the longitudinal centre line 15 of the circumscribed rectangle 16 of the cross-section.

The reduction in area is in casu approximately 20% in comparison with harrow tines of ordinary design.

We claim:

1. A generally S-shaped harrow tine comprising an upper resilient hoop portion (2) that is curved substantially along a circular arc and an oppositely curved lower portion (3) adapted to support a harrow point, said tine including a cross-sectional shape (9) in said hoop portion (2) and defined by a circumscribed rectangle (16) having two spaced short sides defining a width and two spaced long sides defining a height wherein the width to height ratio is approximately three, an outwardly-facing upper long side (14) of said cross-sectional shape (9) coinciding with an upper long side of the circumscribed rectangle (16), a symmetrical generally trapezoidal recess (12) in said cross-sectional shape (9) having one wall coinciding with the lower long side of the circumscribed rectangle (16) and a second wall (11) shorter than said one wall in spaced generally parallel relation thereto, said recess decreasing inwardly from its one wall to its second wall, and an inwardly-facing lower long side (11) of said cross-sectional shape (9) coinciding with said second wall of said recess (12) effecting a reduction in area of the cross-sectional shape (9).

* * * * *